(12) United States Patent
Nishida et al.

(10) Patent No.: US 6,624,972 B1
(45) Date of Patent: Sep. 23, 2003

(54) MAGNETIC HEAD, METHOD OF MANUFACTURING MAGNETIC HEAD AND INFORMATION RECORDING APPARATUS

(75) Inventors: Syuji Nishida, Kawasaki (JP); Ikuya Tagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 09/652,736

(22) Filed: Aug. 31, 2000

(30) Foreign Application Priority Data

Dec. 10, 1999 (JP) .......................................... 11-351172

(51) Int. Cl.7 .............................................. G11B 5/147
(52) U.S. Cl. ....................................................... 360/126
(58) Field of Search .................................. 360/120, 121

(56) References Cited

U.S. PATENT DOCUMENTS 4,670,807 A * 6/1987 Gorter et al. ............... 360/120

5,173,822 A * 12/1992 Kuriyama et al. .......... 360/120

FOREIGN PATENT DOCUMENTS

| JP | 1-179213 | 7/1989 |
| JP | 07110918 | 4/1995 |
| JP | 09016904 | 1/1997 |
| JP | 10021507 | 1/1998 |

* cited by examiner

*Primary Examiner*—Robert S. Tupper
(74) *Attorney, Agent, or Firm*—Greer, Burns & Crain, Ltd.

(57) ABSTRACT

A magnetic head has a lower sub-magnetic pole and an upper sub-magnetic pole disposed to be adjacent to a moving magnetic disk. The lower sub-magnetic pole and the upper sub-magnetic pole are placed adjacent one another with a predetermined interval at an adjacent point to the magnetic disk. A magnetic field is generated between those magnetic poles so that the magnetic disk is magnetized. A soft magnetic film extending between the magnetic poles and a first non-magnetic film and a second non-magnetic film supporting the soft magnetic film are disposed between the magnetic poles.

7 Claims, 13 Drawing Sheets

MAGNETIC HEAD, METHOD OF MANUFACTURING MAGNETIC HEAD AND INFORMATION RECORDING APPARATUS

BACKGROUND OF THE INVENTION

1. Field of the Invention

The present invention relates to a magnetic head for generating a magnetic field to magnetize an external medium, a magnetic head manufacturing method of manufacturing a magnetic head, and an information recording apparatus for recording information on a medium.

2. Description of the Related Art

Recently, as a computer is widely used, a large amount of information is usually dealt with. As one of information recording apparatuses for recording such a large amount of information, there is used a hard disk drive (HDD). Generally, a hard disk drive (HDD) has a magnetic disk which is a disk-like shaped medium for storing information, and a recording head for causing information to be stored in the magnetic disk.

The magnetic disk has a ferromagnetic layer consisting of a ferromagnetic material on a surface thereof. Magnetization is independently maintained on each of microscopic areas of the ferromagnetic layer. The magnetic disk is subjected to a high speed rotation inside the HDD. The recording head has a microscopic recording coil and a pair of magnetic poles. Generally, the recording head is disposed to be adjacent to the magnetic disk. The pair of magnetic poles are placed over against one another with a predetermined interval (gap length) in a direction in which a track of the magnetic disk is extended. The pair of magnetic poles have a predetermined width corresponding to the track width in the track width direction. When a signal current conducts through the recording coil, a magnetic field generates from the recording coil in accordance with the signal current. The magnetic field thus generated is leaked from the pair of magnetic poles, so that magnetization of each track on the surface of the magnetic disk is suitably reversed in a microscopic length unit according to the gap length. Such a reversal of the magnetization causes information to be recorded in form of a direction of magnetization of each microscopic domain.

In order to hold magnetization of each microscopic domain of the magnetic disk thus oriented, there is a need that the ferromagnetic layer of the surface of the magnetic disk has a predetermined or more coercive force $H_c$. On the other hand, it is needed for a recording head for recording information on the magnetic disk to apply to the magnetic disk such a magnetic field that a magnetic field (a head magnetic field $H_h$) in the ferromagnetic layer becomes stronger than the coercive force $H_c$ of the magnetic disk so that the respective magnetization of the magnetic disk is reversed.

Generally, the magnetic field generated from the recording head is leaked out of the track as the object of the recording. The leaked magnetic field has an effect on direction and magnitude of magnetization out of the track. Generally, it is considered that intensity of the magnetic field at the lower limit, on which the reversal of magnetization occurs, is ½ of the coercive force $H_c$ of the magnetic disk. Thus, in a range that intensity of the magnetic field leaked out of the track as the recording object is not less than ½ of the coercive force $H_c$ of the magnetic disk, there is a possibility that the magnetization is reversed also at the out side of the track and whereby recording-stain occurs. The recording-stain is defined in magnitude by a spread in a track width direction as to one end of the range as mentioned above. Generally, the recording-stain becomes relatively larger with respect to the track width, as the track width becomes smaller. Accordingly, the recording-stain is an obstacle to recording information onto the magnetic disk at high recording density. In order to reduce the recording-stain, there is a method of reducing the gap length whereby a leakage of the magnetic field to the out side of the track as the recording object is suppressed.

However, when the gap length is reduced, reversal of magnetization by the recording head in the track as the recording object is performed in the narrow range in the track direction according to the gap length. As the range is narrower, a demagnetizing field of the reversed magnetization is increased, and as a result, intensity of the magnetic field generated from the recording head is weaken by the demagnetizing field. In this manner, when intensity of the magnetic field is weaken, there occurs a shift (a hard transition shift: HTS) of a magnetization transition point at the boundary of an area wherein magnetization is reversed, and as a result, a range in which magnetization is actually reversed, that is, a range in which the recording magnetic field exceeds the medium $H_c$, is narrowed. This causes overwrite characteristics of recording of information onto the magnetic disk by the recording head, that is, a ratio of reproducing output of information newly recorded to reproducing output of information before overwriting still remained in the event that information is overwritten on the magnetic disk, to deteriorate. As mentioned above, according to the conventional recording head, it is difficult to cope with both reducing the recording-stain and providing excellent overwrite characteristics.

SUMMARY OF THE INVENTION

In view of the foregoing, it is an object of the present invention to provide a magnetic head having excellent overwrite characteristics capable of reducing the recording-stain, a magnetic head manufacturing method of manufacturing the magnetic head, and an information recording apparatus having excellent overwrite characteristics capable of reducing the recording-stain.

To achieve the above-mentioned objects, the present invention provides a magnetic head having a pair of magnetic poles disposed to be adjacent to or in contact with a recording medium relatively moving, said pair of magnetic poles being placed over against one another with a predetermined interval in a relative moving direction at an adjacent point or a contact point to the recording medium, in which a magnetic field is generated between the magnetic poles so that the recording medium is magnetized, wherein a soft magnetic film expanding in a direction blocking facing of the pair of magnetic poles and a non-magnetic film supporting the soft magnetic film are alternately laminated at a position located between the pair of magnetic poles.

In a magnetic head, generally, one or both of a pair of magnetic poles constituting the magnetic head is provided with a sub-magnetic pole at the end wherein the pair of magnetic poles face one another. A spatial distribution of a magnetic field generated between the pair of magnetic poles is controlled by the sub-magnetic pole in accordance with shape, size and material of the sub-magnetic pole. In the event that a magnetic head of the present invention, a magnetic head referred to in a magnetic head manufacturing method of the present invention, which will be described later, and a magnetic head referred to in an information recording apparatus of the present invention, which will be also described later, have such a sub-magnetic pole, the magnetic pole referred to in the present invention implies such a sub-magnetic pole.

Generally, according to a magnetic head, when a predetermined interval is spread between a pair of magnetic poles, HTS is suppressed to be small and an overwrite characteristic is improved. On the other hand, the soft magnetic film is magnetized by a magnetic field generated between the pair of magnetic poles to attract a flux, and thus even in the event that the interval between the pair of magnetic poles is spread, the soft magnetic film serves to suppress a recording-stain in a direction along the recording medium perpendicular to the relative moving direction, that is, a so-called track width direction. Thus, in the event that a predetermined interval is ensured between the pair of magnetic poles, according to the present invention, it is possible to provide a magnetic head coping with both the reduction of the recording-stain and the excellent overwrite characteristic.

In the magnetic head of the present invention as mentioned above, it is preferable that the soft magnetic film has a length with respect to the direction perpendicular to the recording medium, which length is shorter than that of the perpendicular direction of each of the pair of magnetic poles.

Hereinafter, a length of the soft magnetic film and each of the pair of magnetic poles in a direction perpendicular to a surface of the recording medium which a magnetic head is disposed to be adjacent to or in contact with is referred to as a height.

In a magnetic head, generally, a distribution of a magnetic field generated between a pair of magnetic poles of the magnetic head is adjusted by the height of the pair of magnetic poles. However, according to the preferred magnetic head, only varying the height of the soft magnetic film makes it possible to readily adjust the distribution of the magnetic field generated between the pair of magnetic poles, without varying the height of the magnetic poles.

In the magnetic head of the present invention as mentioned above, it is preferable that the soft magnetic film has a thickness of 0.075 µm or less.

The magnetic head of the present invention as mentioned above has the above-mentioned soft magnetic film. Accordingly, the head magnetic field $H_h$ is reduced right under the soft magnetic film and offers the minimum value. Incidentally, generally, the head magnetic field $H_h$ implies intensity of a magnetic field generated from the magnetic head at the central portion of the ferromagnetic layer of the recording medium in the thickness direction.

In a magnetic head in which the soft magnetic film has a thickness of 0.075 µm or less, the reduction of the head magnetic field $H_h$ due to the existence of the soft magnetic film is little, and as will be described later in embodiments of the present invention, the minimum value of the head magnetic field $H_h$ right under the soft magnetic film offers 240 kA/m or more which is considered as coercive force $H_c$ of the magnetic disk now generally used. Thus, it is possible to obtain the excellent overwrite characteristic.

Further, in the magnetic head of the present invention as mentioned above, it is preferable that of the pair of magnetic poles, a non-magnetic film adjacent to the magnetic pole located at the lower stream side with respect to the moving direction of the recording medium relatively moving has a thickness of 0.2 µm or less.

When the thickness of the non-magnetic film is 0.2 µm or less, as will be described in embodiments of the present invention, the recording-stain of the recording head is greatly reduced.

Furthermore, in the magnetic head of the present invention as mentioned above, it is preferable that the soft magnetic film has a size smaller than that of the width direction of the pair of magnetic poles with respect to the width direction along the recording medium perpendicular to the relative moving direction.

Generally, the recording-stain is smaller in the event that the size of the soft magnetic film in the width direction is smaller than the size of the pair of magnetic poles in the width direction, as compared with a case where the size of the soft magnetic film in the width direction is larger than the size of the pair of magnetic poles in the width direction.

Still further, in the magnetic head of the present invention as mentioned above, it is preferable that the soft magnetic film has saturation magnetic flux density not more than saturation magnetic flux density of the magnetic pole located at the lower stream side as to the moving direction of the recording medium relatively moving, of the pair of magnetic poles, and also has saturation magnetic flux density not less than saturation magnetic flux density of the magnetic pole located at the upper stream side as to the moving direction of the recording medium relatively moving, of the pair of magnetic poles.

The soft magnetic film has the saturation magnetic flux density larger than that of the magnetic pole (the lower magnetic pole) located at the upper stream side. This feature makes it difficult to magnetically saturate. Thus it is possible to suppress an increment of the recording-stain due to the saturation. However, in the event that the soft magnetic film 3 is similar to the magnetic pole (the upper magnetic pole) located at the upper stream side in size of the track width direction, there is no need that the soft magnetic film has saturation magnetic flux density which is larger than saturation magnetic flux density of the upper magnetic pole since it does not happen that the flux passes through the soft magnetic film more than the upper magnetic pole. Thus, the recording head, which satisfies this condition, makes it possible to effectively enhance the head magnetic field and thereby suppressing a spread of the recording-stain.

To achieve the above-mentioned objects, the present invention provides a magnetic head manufacturing method for manufacturing a magnetic head having a pair of magnetic poles disposed to be adjacent to or in contact with a recording medium relatively moving, said pair of magnetic poles being placed over against one another with a predetermined interval in a relative moving direction at an adjacent point or a contact point to the recording medium, in which a magnetic field is generated between the magnetic is poles so that the recording medium is magnetized, said magnetic head manufacturing method comprising:

a laminated film forming step of forming a laminated film in which a soft magnetic film and a non-magnetic film supporting the soft magnetic film are alternately laminated on a thin film on which one of said pair of magnetic poles is formed;

a magnetic pole forming step of forming another of said pair of magnetic poles, which is subjected to trimming into the predetermined width by a resist patterning, on a surface of the laminated film formed by said laminated film forming step; and a trimming step of applying an ion-milling to the laminated film formed by said laminated film forming step and the another magnetic pole formed by said magnetic pole forming step, so that the laminated film is subjected to trimming into the predetermined width while said another magnetic pole is adopted as a mask.

According to the magnetic head manufacturing method of the present invention as mentioned above, it is possible to readily manufacture a magnetic head corresponding to the magnetic head of the present invention, including trimming of the soft magnetic film.

To achieve the above-mentioned objects, the present invention provides an information recording apparatus having a magnetic head disposed to be adjacent to or in contact with a recording medium relatively moving while carrying a magnetization on each point of a surface of the recording medium, wherein information is recorded on each point of the recording medium by reversing a direction of the magnetization, said magnetic head is a magnetic head having a pair of magnetic poles placed over against one another with a predetermined interval in a relative moving direction at an adjacent point or a contact point to the recording medium, in which a magnetic field is generated between the magnetic poles so that the recording medium is magnetized, wherein a soft magnetic film expanding in a direction blocking facing of the pair of magnetic poles and a non-magnetic film supporting the soft magnetic film are alternately laminated at a position located between the pair of magnetic poles.

According to the information recording apparatus as mentioned above, the magnetic head has the same structure of the magnetic head of the present invention and has the same effect. Thus, it is possible to expect the excellent overwrite characteristic even in recording of high recording density.

Further, according to the information recording apparatus as mentioned above, it is acceptable that the above-mentioned various type of magnetic heads are adopted as the magnetic head. In this case, the information recording apparatus offers the same effect as the adopted various type of magnetic heads. Thus, it is possible to is expect the excellent overwrite characteristic even in recording of high recording density.

In the information recording apparatus according to the present invention as mentioned above, it is preferable that a thickness of said soft magnetic film is adjusted so that a magnetic field generated between said pair of magnetic poles is a magnetic field not less than a coercive force of the recording medium at the adjacent point or the contact point to the soft magnetic film of the surface of the recording medium.

According to the magnetic head of the information recording apparatus as mentioned above, in a similar fashion to that of the magnetic thin film head of the present invention, there is provided the soft magnetic film. Thus, the head magnetic field $H_h$ is reduced right under the soft magnetic film and offers the minimum value. When the thickness of the soft magnetic film is reduced, the reduction of the head magnetic field $H_h$ due to the existence of the soft magnetic film is little, and as will be described later in embodiments of the present invention, the minimum value of the head magnetic field $H_h$ right under the soft magnetic film is increased. Thus, when the thickness of the soft magnetic film 3 is adjusted so that the head magnetic field $H_h$ right under the soft magnetic film exceeds the coercive force $H_c$ of the recording medium, this makes it easy to perform the flux reversal right under the soft magnetic film. This feature makes it possible to provide excellent overwrite characteristics of recording of the information recording apparatus.

Figure 8A:
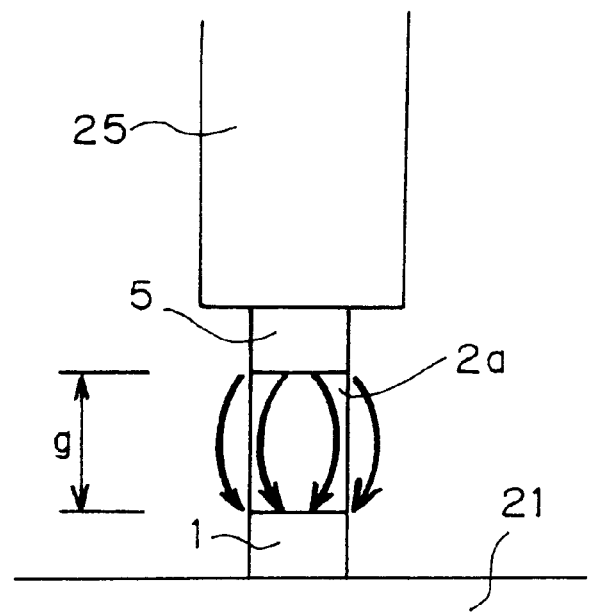
Figure 8B:
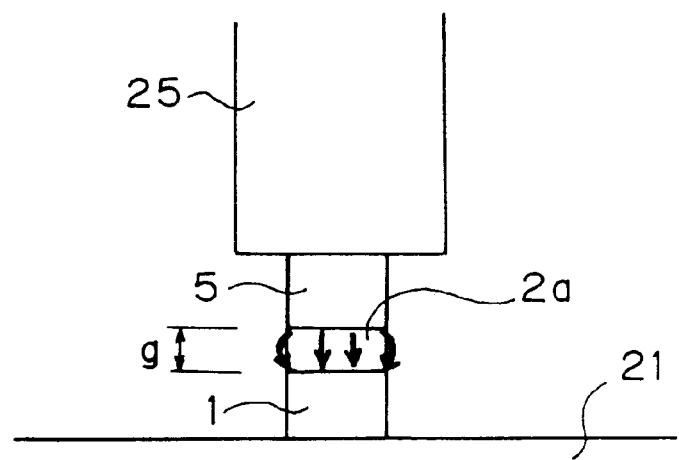

Each of FIGS. 8(A) and 8(B) is an elevational view of a main part of a conventional recording head, showing a state of a magnetic field leaked from the conventional recording head.

Figure 9:
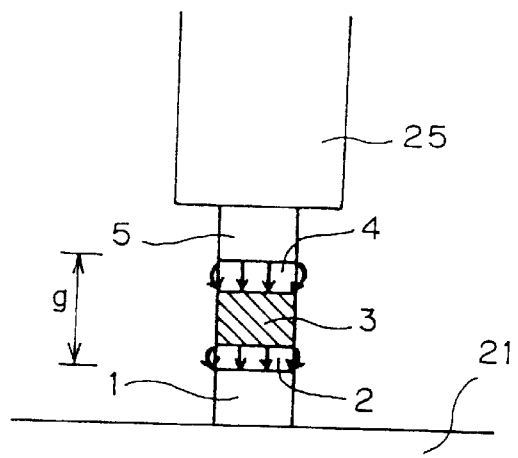

FIG. 9 is an elevational view of a main part of a recording head of the present embodiment, showing a state of a magnetic field leaked from the recording head of the present embodiment.

Figure 10:
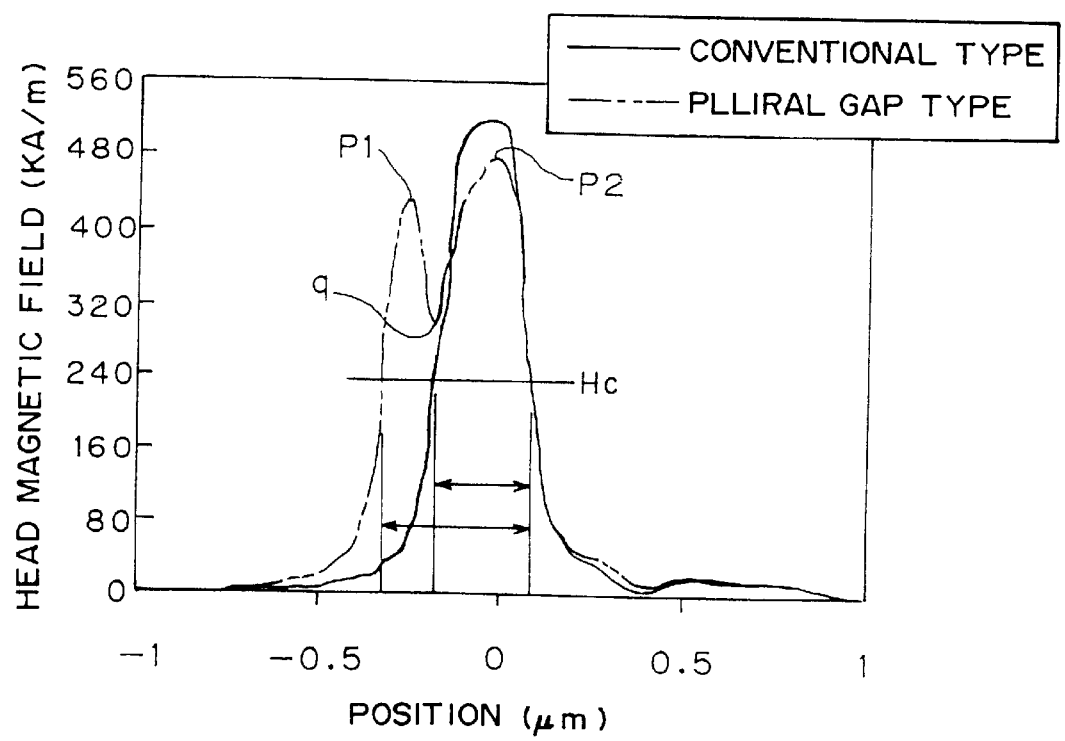

FIG. 10 is a graph showing a distribution of a head magnetic field.

Figure 11:
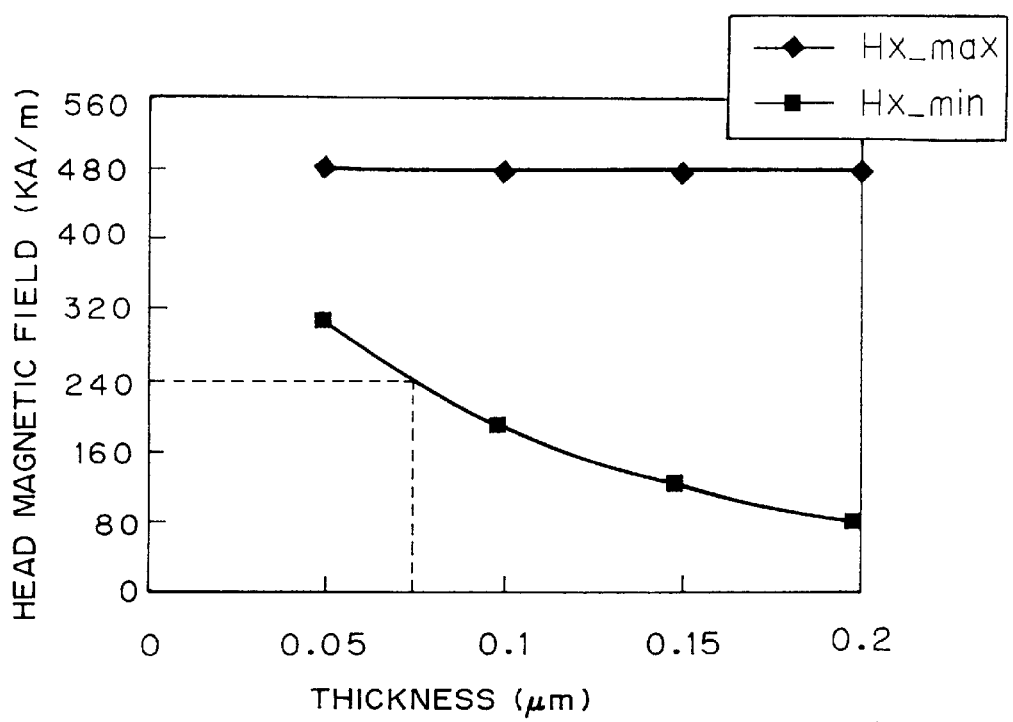

FIG. 11 is a graph showing dependency of a head magnetic field intensity of a recording head of the present embodiment to a film thickness of a soft magnetic film.

Figure 12:
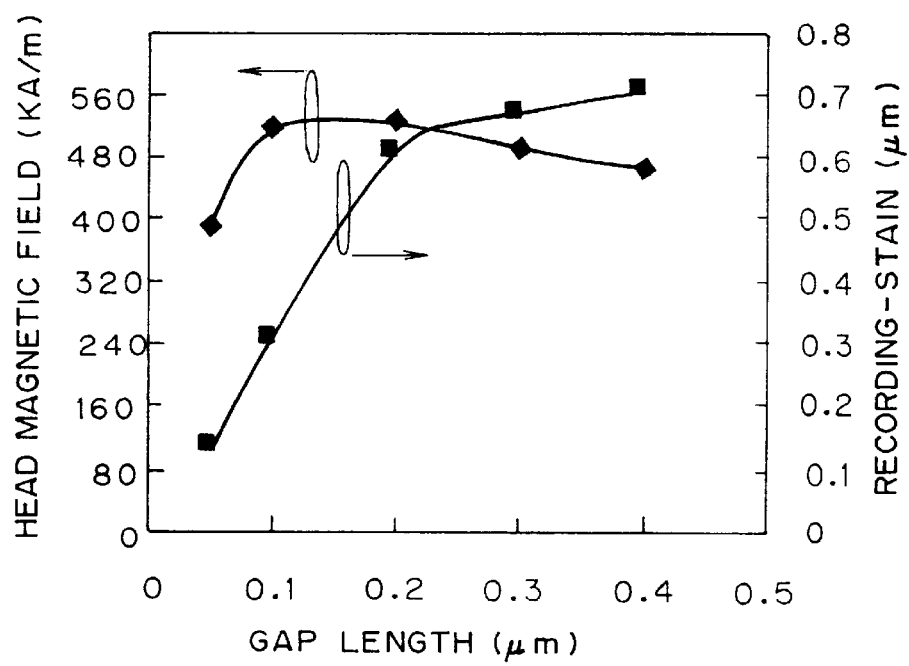

FIG. 12 is a graph showing dependency of head magnetic field intensity and recording-stain to a gap length.

Figure 5:
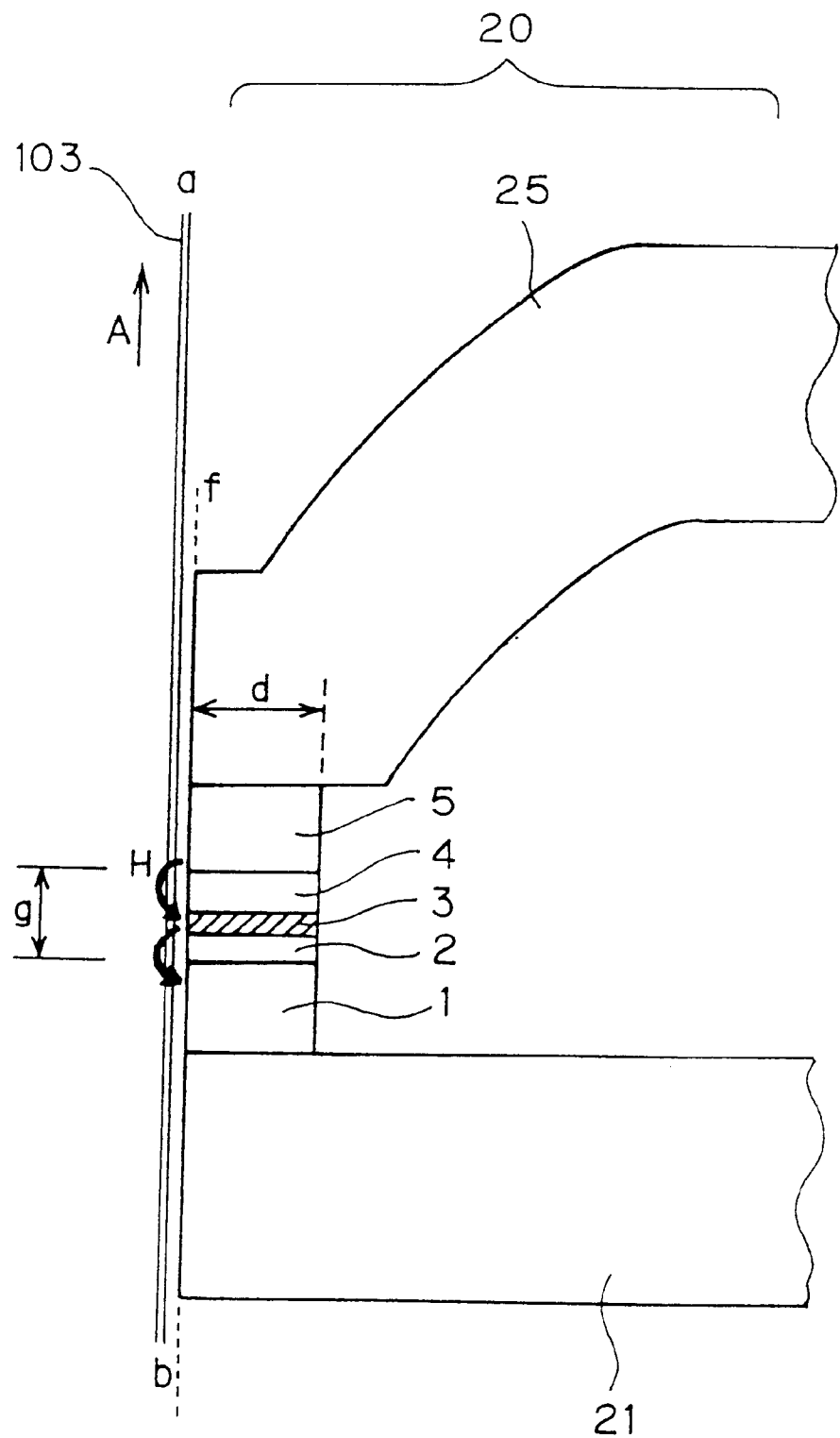
FIG. 5 is a sectional side elevation of a main part of a recording head in the combined magnetic head shown in FIG. 3.
Figure 13:
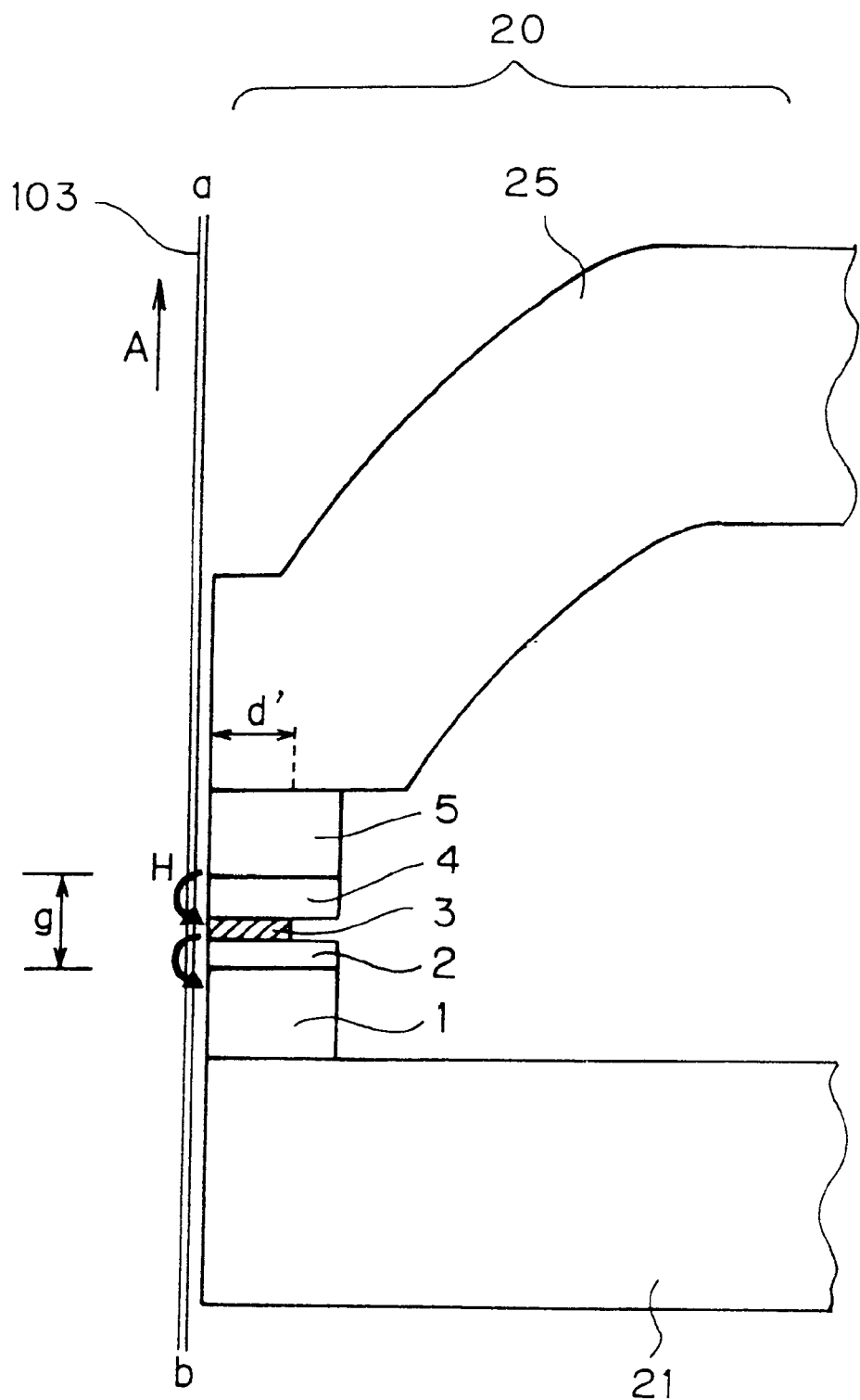

FIG. 13 is an illustration showing an example of a recording head which is different from the recording head shown in FIG. 5 in height of the soft magnetic film.

Figure 6:
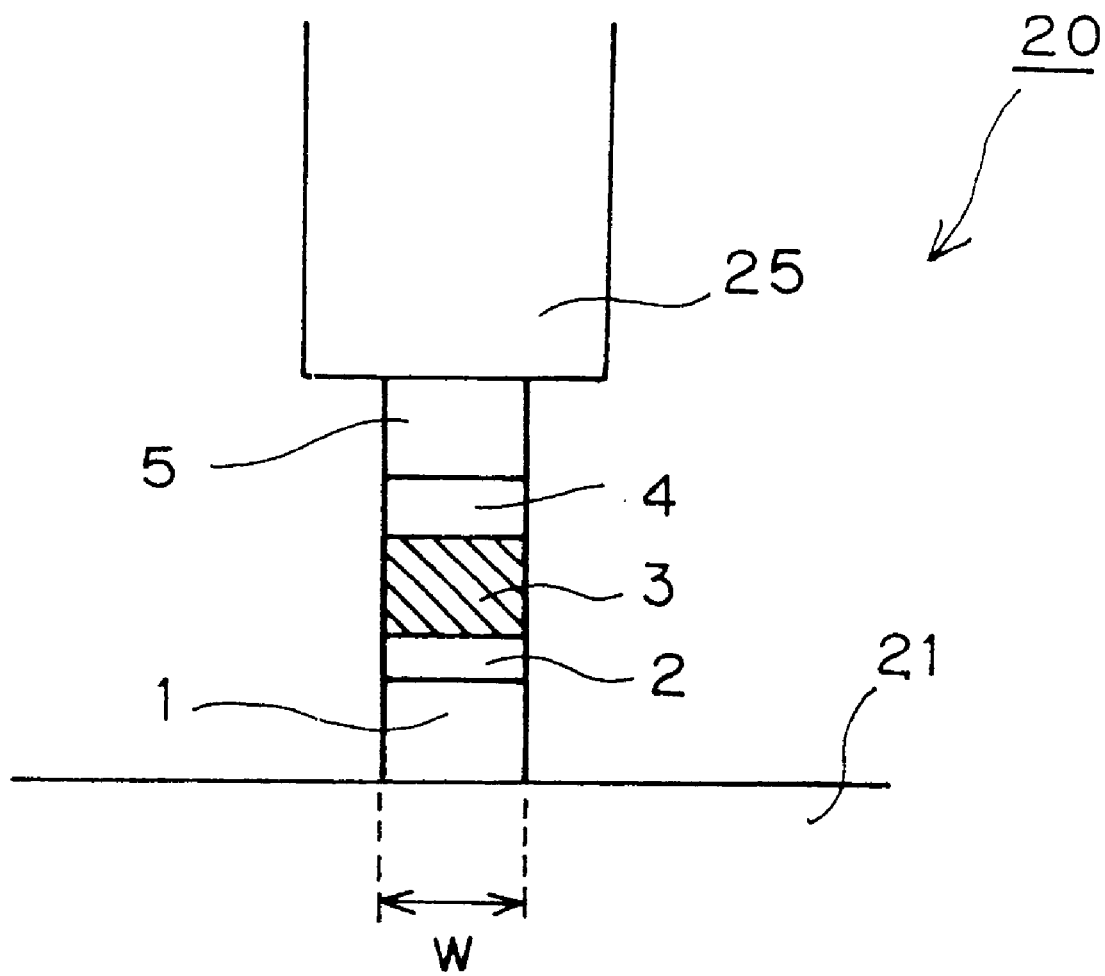
FIG. 6 is an elevational view of a main part of a recording head in the combined magnetic head shown in FIG. 4.
Figure 14:
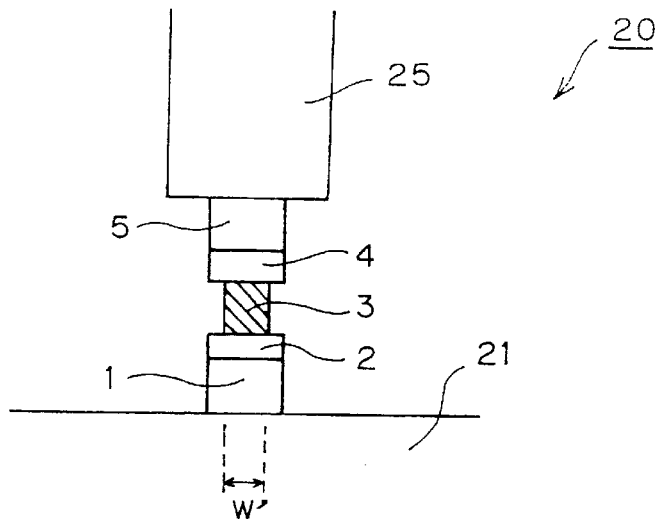

FIG. 14 is an illustration showing an example of a recording head which is different from the recording head shown in FIG. 6 in width of the soft magnetic film.

Figure 15A:
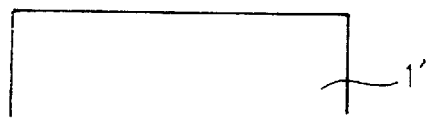
Figure 15B:

Each of FIGS. 15(A) and 15(B) is a view useful for understanding a first step of manufacturing a recording head.

Figure 16A:
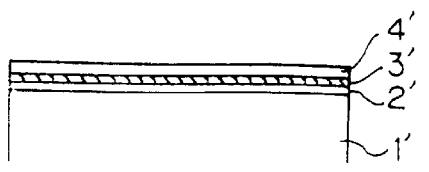
Figure 16B:
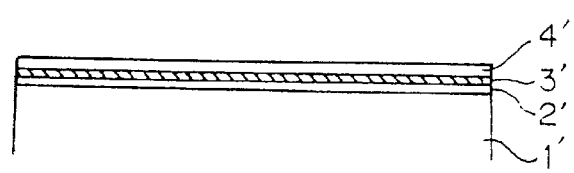

Each of FIGS. 16(A) and 16(B) is a view useful for understanding a second step of manufacturing a recording head.

Figure 17A:
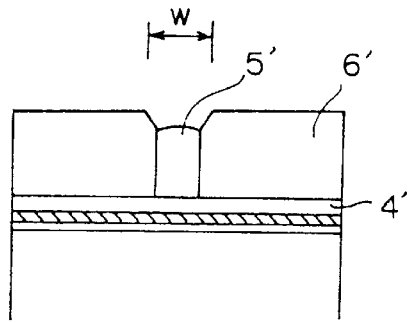
Figure 17B:
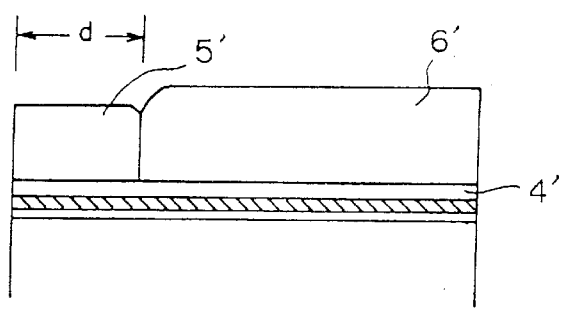

Each of FIGS. 17(A) and 17(B) is a view useful for understanding a third step of manufacturing a recording head.

Figure 18A:
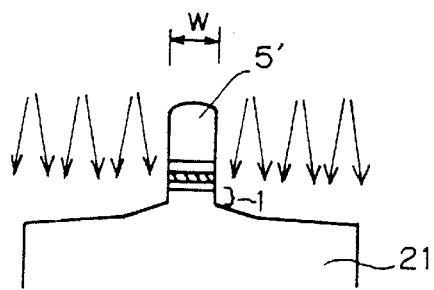
Figure 18B:
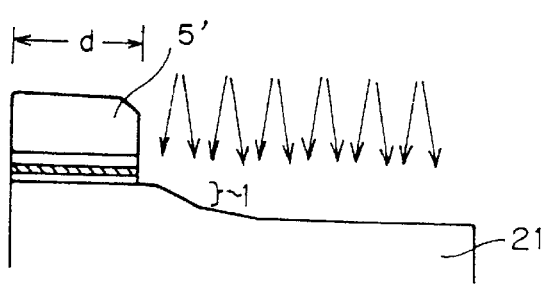

Each of FIGS. 18(A) and 18(B) is a view useful for is understanding a fourth step of manufacturing a recording head.

Figure 19A:
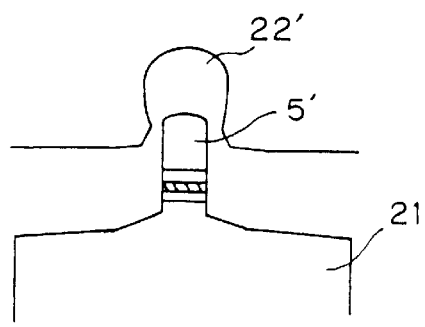
Figure 19B:
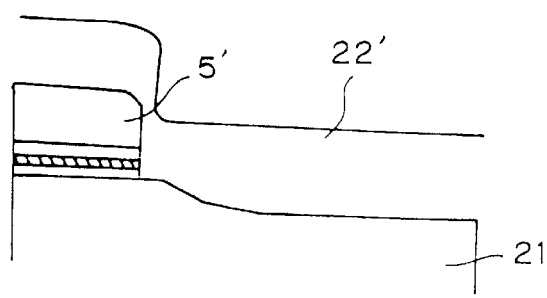

Each of FIGS. 19(A) and 19(B) is a view useful for understanding a fifth step of manufacturing a recording head.

Figure 20A:
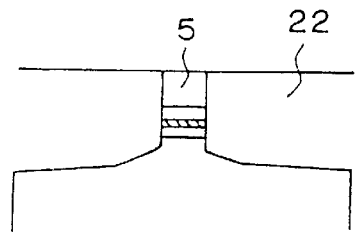
Figure 20B:
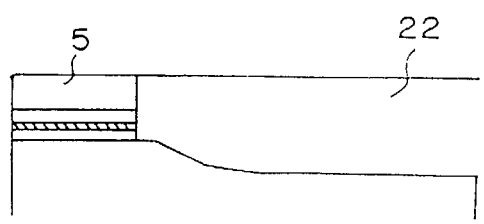

Each of FIGS. 20(A) and 20(B) is a view useful for understanding a sixth step of manufacturing a recording head.

Figure 21A:
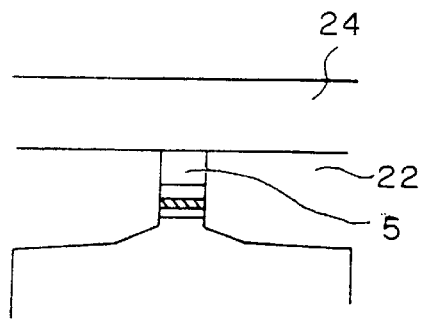
Figure 21B:
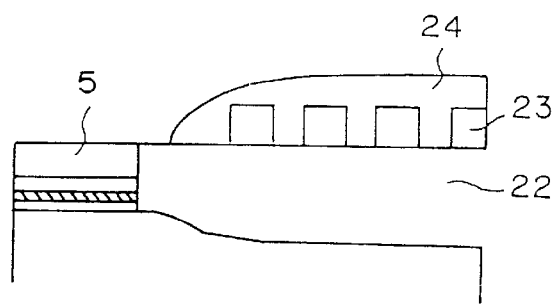

Each of FIGS. 21(A) and 21(B) is a view useful for understanding a seventh step of manufacturing a recording head.

Figure 22A:
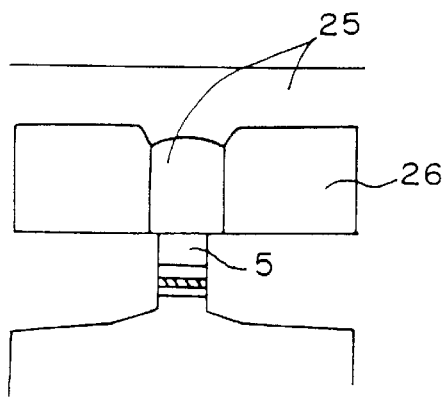
Figure 22B:
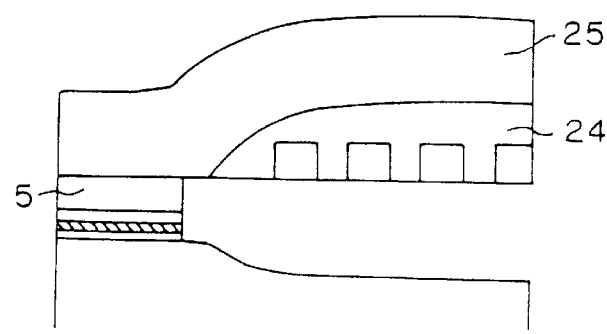

Each of FIGS. 22(A) and 22(B) is a view useful for understanding an eighth step of manufacturing a recording head.

DETAILED DESCRIPTION OF PREFERRED EMBODIMENTS

Hereinafter, there will be described embodiments of the present invention.

Figure 1:
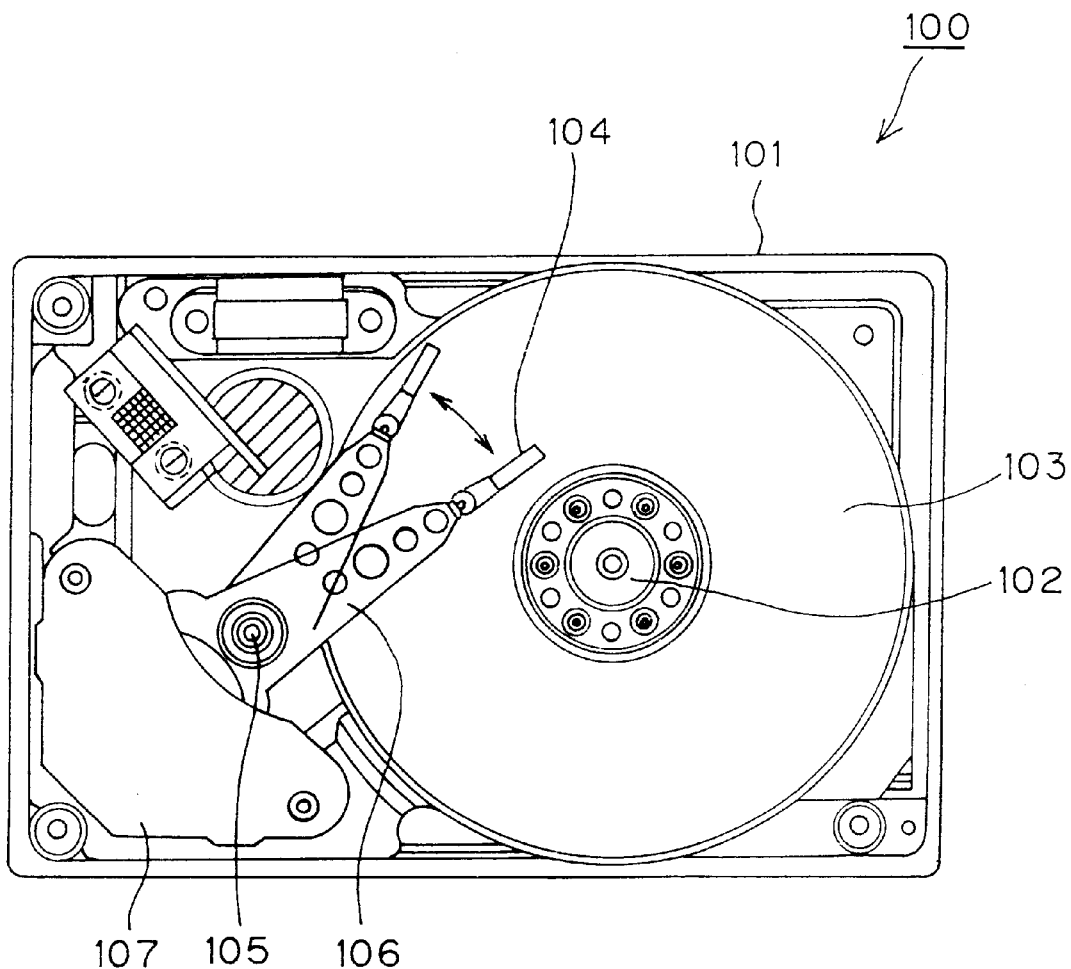
FIG. 1 is a view showing an embodiment of a hard disk drive (HDD) according to the present invention.

FIG. 1 is a view showing an embodiment of a hard disk drive (HDD) according to the present invention.

A hard disk drive (HDD) 100 shown in FIG. 1 corresponds to the information recording apparatus of the present invention. A housing 101 of the HDD 100 shown in FIG. 1 houses a rotary shaft 102, a magnetic disk 103 mounted onto the rotary shaft 102, a broaching head slider 104 placed against over the magnetic disk 103, an arm shaft 105, a carriage arm 106 capable of moving horizontally on the magnetic disk 103 on the arm shaft 105 wherein the broaching head slider 104 is fixed on the top of the carriage arm 106, and an actuator 107 for driving the carriage arm 106 in horizontal movement.

In recording of information onto the magnetic disk 103 and reproducing of information stored in the magnetic disk 103, the carriage arm 106 is driven by the actuator 107 constructed with a magnetic circuit so that the broaching head slider 104 is positioned at a desired track on the magnetic disk 103 rotating. The broaching head slider 104 is equipped with a combined magnetic head (not illustrated in FIG. 1) which comprises a reproducing head and a recording head corresponding to the magnetic head referred to in the present invention. The combined magnetic head may sequentially approach the respective microscopic areas arranged on each track of the magnetic disk 103 by means of rotation of the magnetic disk 103. At the time of recording of information, the combined magnetic head adjacent to the magnetic disk 103 receives electronic recording signals, and the recording head applies a magnetic field to the respective microscopic areas on the magnetic disk in accordance with the recording signals, so that information carried by the recording signals is recorded in from of the direction of magnetization of the microscopic areas. In reproduction of information, the reproducing head derives information, which is recorded in from of the direction of magnetization of the microscopic areas, in form of electric reproducing signals which are generated in accordance with magnetic fields generated from the respective magnetization. The internal space of the housing 101 is closed by a cover (not illustrated).

Figure 2:
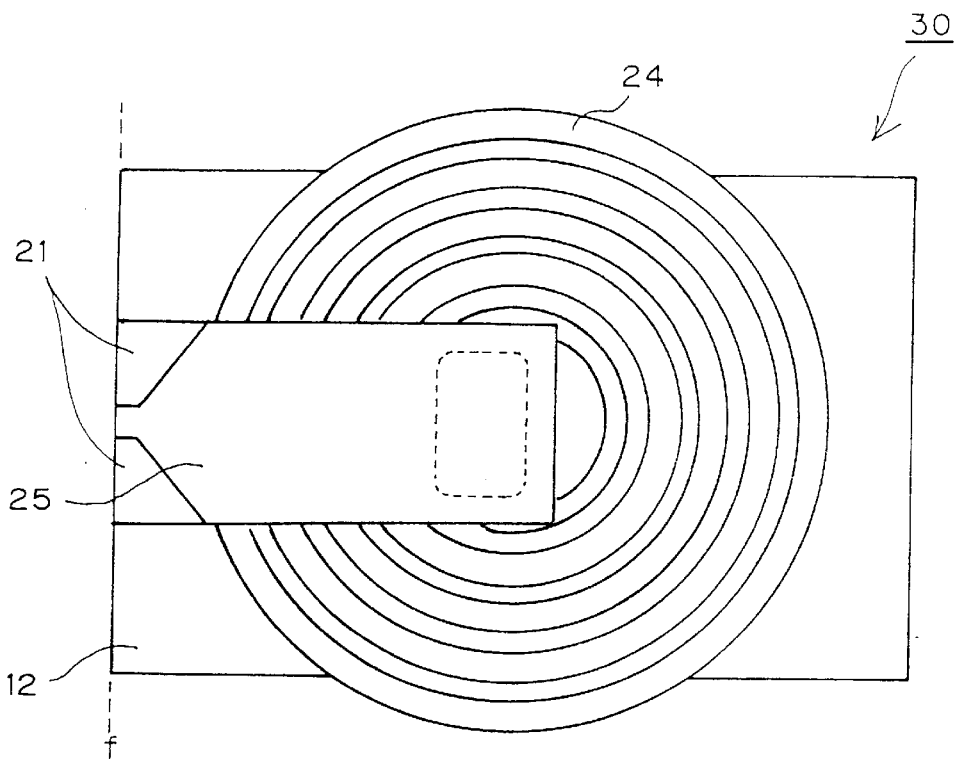
FIG. 2 is a top view of a combined magnetic head used in HDD according to the present embodiment.
Figure 3:
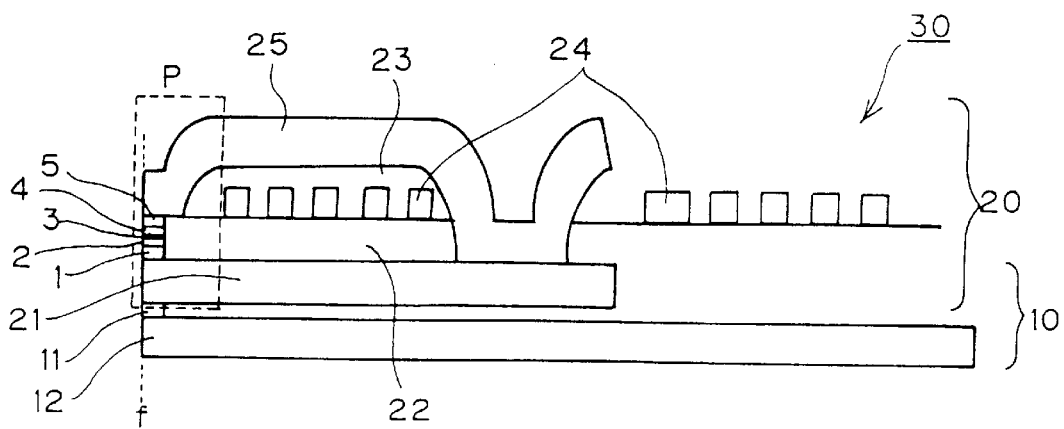
FIG. 3 is a sectional side elevation of a combined magnetic head used in HDD according to the present embodiment.
Figure 4:
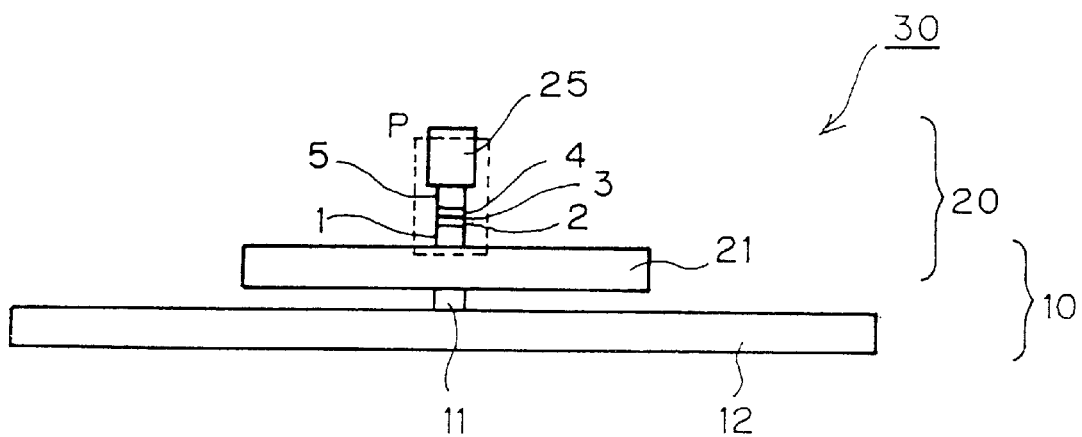
FIG. 4 is an elevational view of a combined magnetic head used in HDD according to the present embodiment.

FIG. 2 is a top view of a combined magnetic head used in HDD according to the present embodiment. FIG. 3 is a sectional side elevation of a combined magnetic head used in HDD according to the present embodiment. FIG. 4 is a broaching surface view (an elevational view) of a combined magnetic head used in HDD according to the present embodiment. Here, the broaching surface implies a surface of the combined magnetic head opposing to the magnetic disk.

A combined magnetic head 30 shown in FIGS. 2 to 4 is positioned adjacent to the magnetic disk 103 (not shown in FIGS. 2 to 4) in HDD 100. In FIGS. 2 and 3, the combined magnetic head 30 shown in FIGS. 2 and 3 faces the magnetic disk 103 on the broaching surface f shown at left side of FIGS. 2 and 3. Since FIG. 4 is the broaching surface view of the combined magnetic head, the combined magnetic head 30 shown in FIG. 4 faces the magnetic disk 103 on the front portion of FIG. 4.

As shown in FIGS. 2 to 4, the combined magnetic head 30 comprises a reproducing head 10 and a recording head 20, wherein the recording head 20 is provided at the back of the reproducing head 10.

The reproducing head 10 comprises an element 11, which includes a magnetoresistive effect element and electrodes, for receiving a magnetic field from the magnetic disk 103 to generate a reproducing signal according to the received magnetic field, and reproducing lower shield 12 and reproducing upper shield 21, each of which consists of a soft magnetic material, disposed in such a manner that the element 11 is sandwiched by the reproducing lower shield 12 and the reproducing upper shield 21 from both sides of a film thickness direction of the element 11.

The recording head 20 comprises: a lower magnetic pole 21 serving as the reproducing upper shield 21 of the reproducing head 10, too; a first insulating layer 22 consisting of $Al_2O_3$ (alumina) formed on the lower magnetic pole 21; a recording coil 23 consisting of C u formed on the first insulating layer 22; a second insulating layer 24 consisting of a resist covering the recording coil 23, said second insulating layer 24 being formed on the lower magnetic pole 21 and the recording coil 23, a main laminated layer formed in the vicinity of the boarding surface f on the lower magnetic pole 21, wherein a lower sub-magnetic pole 1, a first non-magnetic film 2, a soft magnetic film 3, a second non-magnetic film 4, and a upper sub-magnetic pole 5 are laminated in the named order, and an upper magnetic pole 25 formed in such a manner that it is laminated on the main laminated layer, said second insulating layer 24 and the lower magnetic pole 21 at the center portion of the recording coil 23.

Incidentally, the first insulating layer 22 is not restricted to one which consists of $Al_2O_3$ (alumina). It is acceptable that the first insulating layer 22 is one which consists of a non-magnetic insulating material other than $Al_2O_3$ (alumina). Further, the second insulating layer 24 is not restricted to one which consists of the resist. It is acceptable that the second insulating layer 24 is one which consists of a non-magnetic insulating material other than the resist.

The upper magnetic pole 25 and the lower magnetic pole 21 form, as shown in FIG. 3, a magnetic circuit passing through the center of the recording coil 23 and going round the recording coil 23. The magnetic field generated from the recording coil 23 passes the upper magnetic pole 25 and the lower magnetic pole 21 and leaks out from the vicinity of a portion, wherein the upper magnetic pole 25 and the lower magnetic pole 21 face one another, facing the magnetic disk 103, more exactly to say, from the lower sub-magnetic pole 1 and the upper sub-magnetic pole 5. The leaked magnetic field causes the magnetization of the respective microscopic areas of the magnetic disk 103 to be reversed.

Next, there will be explained the main laminated layer constituting the main part of the recording head 20.

FIG. 5 is a sectional side elevation of the main part of the recording head in the combined magnetic head shown in FIG. 3. FIG. 6 is an elevational view of the main part of the recording head in the combined magnetic head shown in FIG. 4.

In FIG. 5, the main part P of the recording head 20 shown in FIG. 3, which is encircled with a dotted line in the left side of FIG. 3, is shown with an enlargement, and there is shown a state that the recording head 20 faces the magnetic disk 103 at the broaching surface f of the recording head 20 shown in FIG. 5. Further, in FIG. 6, the main part P of the recording head 20 shown in FIG. 4, which is encircled with a dotted line in FIG. 4, is shown with an enlargement, and there is shown a state that the recording head 20 faces the magnetic disk 103 not shown in FIG. 6.

In FIGS. 5 and 6, there are shown the lower magnetic pole 21, the main laminated layer consisting of the lower sub-magnetic pole 1 laminated on the lower magnetic pole 21, the first non-magnetic film 2 laminated on the lower sub-magnetic pole 1, the soft magnetic film 3 laminated on the first 4 laminated on the soft magnetic film 3, and the upper sub-magnetic pole 5 laminated on the second non-magnetic film 4 laminated on the soft magnetic film 3, and the upper sub-magnetic pole 5 laminated on the second non-magnetic film 4, and the upper magnetic pole 25 laminated on the main laminated layer.

The lower magnetic pole 21 and the upper magnetic pole 25 are a magnetic pole consisting of $NI_{50}Fe_{50}$(at%) having thickness of 3 μm. Regarding the main laminated film, the lower sub-magnetic pole 1 consisting consists of $NI_{50}Fe_{50}$ having thickness of 1 μm, the first non-magnetic film 2 is a film consisting of alumina having thickness of 0.1 μm. The soft magnetic film 3 is a film consisting of $NI_{50}Fe_{50}$ having thickness of 0.05 μm. The second non-magnetic film 4 is a film consisting of alumina having thickness of 0.2 μm. The upper sub-magnetic pole 5 consists of $NI_{50}Fe_{50}$ having thickness of 2 μm.

Incidentally, those thickness for the lower magnetic pole 21 and the upper magnetic pole 25, and the sub-magnetic poles, the non-magnetic films and the soft magnetic film 3, which constitute the main laminated film, is shown by way of example, and should not be restricted to those thickness as mentioned above.

Further, it is acceptable that each of the lower magnetic pole 21, the upper magnetic pole 25, the lower sub-magnetic pole 1, the upper sub-magnetic pole 5 and the soft magnetic film 3 consists of a soft magnetic material, such as $Ni_{80}Fe_{20}$ (at%), CoNiFe, FeZrN, as well as $Ni_{50}Fe_{50}$, or alternatively it is acceptable that each of those elements is a film in which those soft magnetic material including $Ni_{50}Fe_{50}$ are laminated with a plurality of layers. Furthermore, it is acceptable that each of the first non-magnetic film 2 and the second non-magnetic film 4 is a film consisting of a non-magnetic material other than alumina, as well as alumina.

The main laminated film is subjected to a trimming in a firm into a rectangle, and has a core width w of 0.5 μm in a direction of a track width of the magnetic disk 103 at the portion adjacent to the broaching surface f of the recording head, that is, a direction wherein the main laminated film spreads when looking the broaching surface view of FIG. 6, and also has a height d of 1.5 μm in a direction of height, that is, a direction perpendicular to the surface of the magnetic disk 103 when looking the sectional side elevation of FIG. 5.

The values of the core width w and the height d are shown by way of example, and the core width w and the height d are not restricted to those values.

According to the present embodiment, the recording head is arranged in such a manner that a single layer of soft magnetic film 3, which spreads in a direction wherein facing of the lower sub-magnetic pole 1 and the upper sub-magnetic pole 5 are blocked, and two layers of non-magnetic film supporting the soft magnetic film 3 are laminated at the position sandwiched by the lower sub-magnetic pole 1 and the upper sub-magnetic pole 5. However, according to the present invention, it is acceptable that the magnetic head is arranged in such a manner that a plurality of soft magnetic films, which spread in a direction wherein facing of the lower sub-magnetic pole 1 and the upper sub-magnetic pole 5 are blocked, and non-magnetic films supporting the respective soft magnetic films are alternately laminated at the position sandwiched by the lower sub-magnetic pole 1 and the upper sub-magnetic pole 5.

The magnetic disk 103 adjacent to the recording head 20, as shown in FIG. 5, moves in a direction of an arrow A relatively to the recording head 20. The lower sub-magnetic pole 1 is located at the upper stream side b with respect to a movement of the magnetic disk 103 in a direction of the arrow A. The upper sub-magnetic pole 5 is located at the lower stream side a with respect to a relative movement of the magnetic disk 103.

FIG. 5 typically shows a magnetic field H leaked between the lower sub-magnetic pole 1 and the upper sub-magnetic pole 5. The leaked magnetic field H causes a direction of the magnetization of each microscopic area of the magnetic disk 103 to be suitably reversed, so that information is recorded from the lower stream side a to the upper stream side b in turn.

In order to provide a preferable overwrite characteristic of recording for information by the recording head 20 onto the magnetic disk 30, there is a need to set up a gap length g (an interval between the lower sub-magnetic pole 1 and the upper sub-magnetic pole 5) shown in FIG. 5 to be a predetermined value or more so that HTS, which will be described hereinafter, is suppressed to be small.

Figure 7:
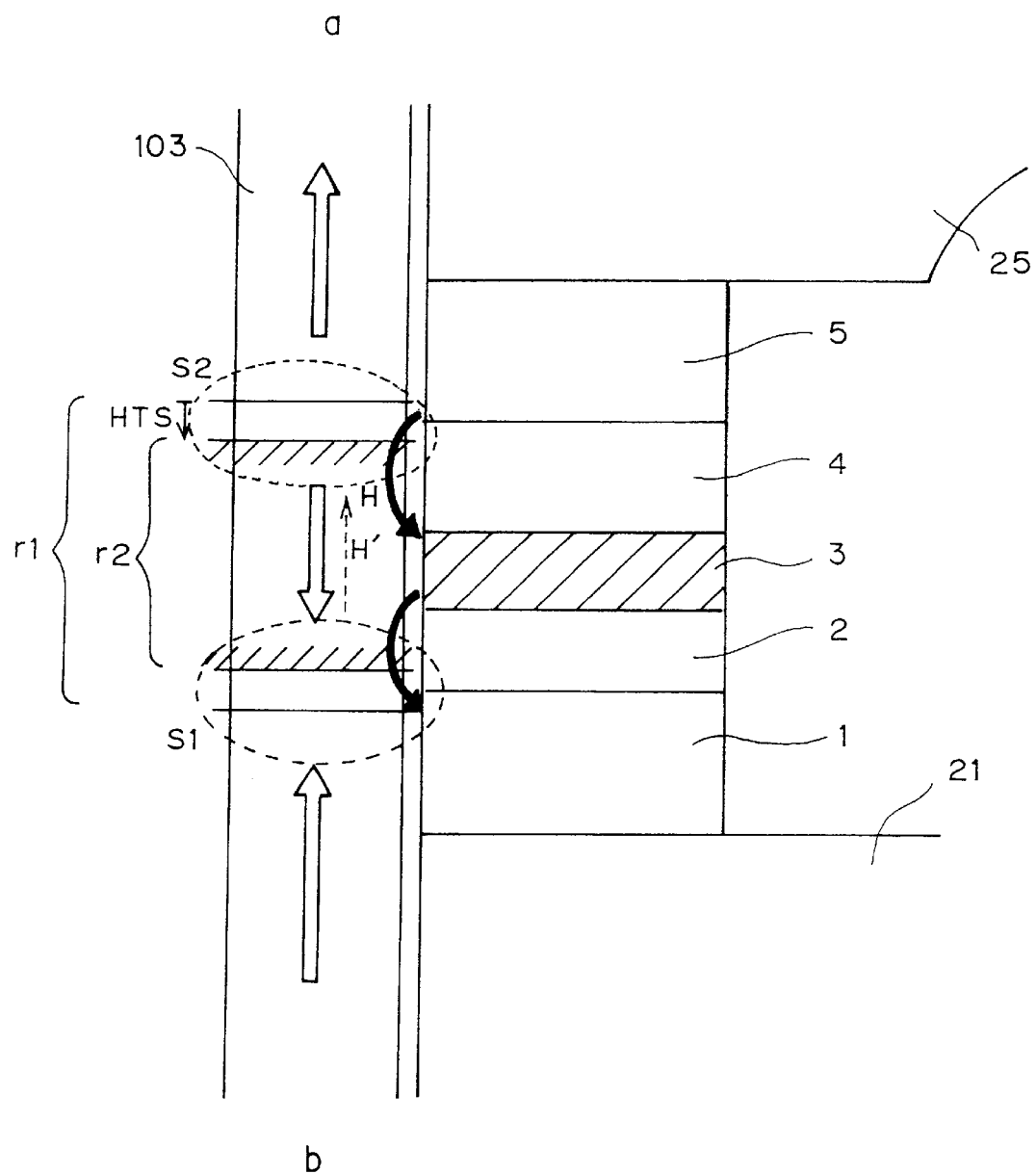
FIG. 7 is an explanatory view useful for understanding HTS.

FIG. 7 is an explanatory view useful for understanding HTS.

In a similar fashion to that of FIG. 5, FIG. 7 shows the recording head 20 wherein the magnetic disk 103 is shown with an enlargement for the purpose of easy understanding of magnetization of the track as an object of recording.

A plurality of outline arrows shown on the magnetic disk 103 denote a direction of magnetization at the position wherein the associated arrow is drawn on the track. In FIG. 7, magnetic fields H represented by two curved arrows are applied from the magnetic pole of the recording head 20 with respect to the magnetization in a direction directed from the upper stream side b to the lower stream side a on the magnetic disk 103, in opposite direction. The magnetization is reversed at the area wherein the magnetic fields H are applied, on the magnetic disk 103.

Preferably, the reversal of the magnetization occurs in area r1 in which a head magnetic field $H_h$ representative of intensity of the magnetic field H in the ferromagnetic layer of the magnetic disk is larger than a coercive force $H_c$ of the magnetic disk. However, when such a reversal of the magnetization occurs, one poles of the magnetization face one another in an area s1 of an ellipse drawn with a dotted line, and the opposite poles face one another in an area s2 of an ellipse drawn with a dotted line, so that the opposite magnetic field H' oriented in the opposite direction to the magnetic field $H_c$ as shown with a dotted arrow, occurs. Thus, the head magnetic field $H_h$ is weakened by the opposite magnetic field H'. When the head magnetic field $H_h$ is weakened, there occurs a shift (HTS) represented by the solid arrow, of the magnetization transfer point which is a boundary of the area wherein the magnetization is reversed, so that the area wherein the magnetization is actually reversed is narrowed from the area r1 to the area r2. Thus, when the area wherein the magnetization is reversed is narrowed, the overwrite characteristic by the recording head 20 to the magnetic disk 103 deteriorates.

As the length (the effective gap length) of the area r2 in the track direction becomes short, the intensity of the opposite magnetic field causing the HTS is increased. Consequently, in order to suppress the HTS, it is effective that the gap length g is extended to provide a long effective gap length. Thus, an extension of the gap length g makes it possible to improve the overwrite characteristic.

However, according to the conventional recording head, in view of the recording-stain which will be described below, it is difficult to provide a long gap length g as mentioned above.

Each of FIGS. 8(A) and 8(B) is an elevational view of a main part of a conventional recording head, showing a state of a magnetic field leaked from the conventional recording head.

Each of FIGS. 8(A) and 8(B) shows the conventional recording head in which the soft magnetic film 3 is removed from the recording head 20 shown in FIG. 6, and the first non-magnetic film 2 and the second non-magnetic film 4 are replaced by a single non-magnetic film 2a.

A difference between the recording head shown in FIG. 8(A) and the recording head shown in FIG. 8(B) resides in magnitude of the gap length g. The recording head shown in FIG. 8(A) is longer in gap length g as compared with the recording head shown in FIG. 8(B).

According to the recording head shown in FIG. 8(A), a magnetic field represented by arrows directed from the upper sub-magnetic pole 5 to the lower sub-magnetic pole 1 is generated on a gap portion defined by the gap length g. This magnetic field is greatly spread out of the core width. In the state that the magnetic field is greatly spread out, the magnetic field will be leaked out not only the inside of a track as the object of recording of information but also the outside of the track, so that the magnetic field is applied to the track and thereby producing a recording-stain. As a spread of the magnetic field at the gap portion is increased, the recording-stain is larger.

Also in the recording head shown in FIG. 8(B), a magnetic field represented by arrows directed from the upper sub-magnetic pole 5 to the lower sub-magnetic pole 1 is generated on a gap portion defined by the gap length g. This magnetic field is also spread out of the core width. However, in this case, a degree of spread is small. Thus, in the event that the gap length g is short, the spread of the magnetic field is small, and thus the recording-stain is also small.

As mentioned above, according to the conventional recording head, in order to reduce the recording-stain, there is a need to reduce the gap length g, and in order to improve the overwrite characteristic, there is a need to increase the gap length g. Thus, it is difficult to cope with both the reduction of the recording-stain and the excellent overwrite characteristic. However, the recording head 20 according to the present embodiment is different in situation.

FIG. 9 is an elevational view of a main part of a recording head of the present embodiment, showing a state of a magnetic field leaked from the recording head of the present embodiment.

FIG. 9 shows a main part of the recording head 20 shown also in FIG. 6 and a state of the magnetic field near the main part. The recording head 20 has a large gap length g similar to the conventional recording head shown in FIG. 8(A). However, the recording head 20 is different from the conventional recording head in the point that the recording head 20 has a soft magnetic film 3, which is defined by the gap length g, at a gap portion between the upper sub-magnetic pole 5 and the lower sub-magnetic pole 1. The soft magnetic film 3 is magnetized by a magnetic field leaked out at the gap portion, and collects magnetic fluxes as shown by the arrows of the gap portion in FIG. 9. Thus, according to the recording head 20 of the present embodiment, it is possible to suppress the spread of the magnetic field leaked out the gap portion and thereby suppressing the recording-stain.

The recording head 20 according to the present embodiment has such a soft magnetic film 3. This feature makes it possible to provide a recording head capable of coping with both the excellent overwrite characteristic and reduction of the recording-stain by means of ensuring a predetermined size of gap length g.

Next, there will be explained in detail a result of a simulation of intensity of a magnetic field leaked out from a recording head and a recording-stain. It is noted that results of head magnetic fields and a recording-stain shown in FIGS. 10 to 12 are obtained through computation of a software for computation of electromagnetic field intensity: ELF magic upon setting up size, configuration and material (permeability $\mu$ and saturation magnetic flux density of the material) of the recording head 20, excepting for a case of an especial designation for ones such as a thickness of the soft magnetic film 3 and a gap length. Incidentally, it is assumed that the conventional recording head referred to hereinafter is so arranged that only a non-magnetic film consisting of alumina is formed between two sub-magnetic poles of the recording head 20.

FIG. 10 is a graph showing a distribution of a head magnetic field.

FIG. 10 shows magnetic field distributions representative of position dependency as to a direction along a track as the recording object of the head magnetic field $H_h$ applied to the magnetic disk 103 by the recording head 20 according to the present embodiment as shown in FIG. 5, and the head magnetic field $H_h$ applied to the magnetic disk by the conventional recording head, respectively. In FIG. 10, the axis of abscissas denotes a position along the track in which the positive direction corresponds to the direction of the down stream side b shown in FIG. 5. The axis of ordinates denotes a head magnetic field $H_h$. In FIG. 10, the solid line shows a head magnetic field distribution by the conventional recording head having the gap length g of 0.2 $\mu$m. And the two-dot chain line shows a head magnetic field distribution by the recording head 20 according to the present embodiment having, at the gap portion, the soft magnetic film 3 and two non-magnetic films between which the soft magnetic film 3 is sandwiched. The horizontal line drawn at the position of the magnetic field 240 kA/m denotes intensity of a coercive force H, of the general magnetic disk.

The head magnetic field distribution of the conventional recording head, which is represented by the solid line, has one peak exceeding 500 kA/m in head magnetic field $H_h$, and exceeds the coercive force $H_c$ of the magnetic disk 103 in the range of 0.251 $\mu$m or so around the peak position.

The head magnetic field distribution of the recording head 20 according to the present embodiment, which is represented by the two-dot chain line, has a first peak p1 wherein the head magnetic field $H_h$ offers 440 kA/m near right under the first non-magnetic film of the recording head 20, and a second peak p2 wherein the head magnetic field $H_h$ offers 480 kA/m near right under the second non-magnetic film of the recording head 20, and further has a minimum point q wherein the head magnetic field $H_h$ offers the minimum value 300 kA/m near right under the soft magnetic film 3 between those two peak positions. The magnetic field distribution having those two peaks exceeds the coercive force $H_c$ of the magnetic disk 103 in the range of 0.4 $\mu$m or so including the positions involved in those two peaks and the minimum values.

FIG. 11 is a graph showing dependency of a head magnetic field intensity of a recording head of the present embodiment to a film thickness of a soft magnetic film.

In FIG. 11, the axis of abscissas denotes a thickness of the soft magnetic film 3, and the axis of the ordinates denotes intensity of the head magnetic field $H_h$. In FIG. 11, a plurality of black diamond shapes and a solid line coupling those diamond shapes represent dependency of intensity of the head magnetic field indicated by the second peak p2 shown in FIG. 10 to the thickness of the soft magnetic film 3. The head magnetic field indicated by the second peak p2 offers a constant value of 480 kA/m over the range in thickness varying from 0.05 μm to 0.2 μm. Further, in FIG. 11, a plurality of black quadrilaterals and a solid line coupling those quadrilaterals represent dependency of intensity of the head magnetic field indicated by the minimum point q shown in FIG. 10 to the thickness of the soft magnetic film 3. The head magnetic field indicated by the minimum point q offers a large value of 300 kA/m in the event that the thickness is thin like 0.05 μm. However, as the thickness is increased, the head magnetic field is monotonously decreased, and when the thickness is increased to 0.2 μm, the head magnetic field offers 80 kA/m. The head magnetic field indicated by the minimum point q offers, as indicated by a dotted line in FIG. 11, intensity exceeding the coercive force $H_c$ of the magnetic disk 103 in the event that the thickness of the soft magnetic film 3 is not more than 0.075 μm.

As seen from the result as mentioned above, when the thickness of the soft magnetic film 3 is adjusted to be not more than 0.075 μm so that the head magnetic field $H_h$ right under the soft magnetic film exceeds the coercive force $H_c$ of the magnetic disk 103, this makes it easy to perform the flux reversal right under the soft magnetic film 3. This feature makes it possible to provide excellent overwrite characteristics of recording of information onto the magnetic disk 103 by the recording head 20.

FIG. 12 is a graph showing dependency of head magnetic field intensity and recording-stain to a gap length.

In FIG. 12, the axis of abscissas denotes a gap length of the conventional recording head. The axis of ordinates a head magnetic field $H_h$ of the conventional recording head and a size of the recording-stain. In FIG. 12, a plurality of black quadrilaterals and a solid line coupling those quadrilaterals represent dependency of the recording-stain due to the magnetic field by the conventional recording head to the gap length. And a plurality of black diamond shapes and a solid line coupling those diamond shapes represent dependency of a peak value of a magnetic field distribution of the head magnetic field by the conventional recording head to the gap length.

Incidentally, the recording head 20 of the present embodiment can be regarded as an equivalence that two the conventional recording heads are coupled to provide two gaps in view of a situation of the magnetic field near the gap portion sandwiched by two sub-magnetic poles. The two gaps refer to the first non-magnetic film 2 and the second non-magnetic film 4. Thickness of those non-magnetic films correspond to gap length of the associated gap. As seen from this equivalence, in FIG. 12, the plurality of black quadrilaterals and the solid line coupling those quadrilaterals represent also dependency of a size of the recording-stain due to the magnetic field by the recording head 20 in the respective gap to the gap length of the respective gap. And the plurality of black diamond shapes and the solid line coupling those diamond shapes represent also dependency of a peak value of a magnetic field distribution of the head magnetic field by the recording head 20 in the respective gap to the gap length of the respective gap.

As shown in FIG. 12, the recording-stain is so large like 0.7 μm in the event that the gap length is 0.4 μm. However, as the gap length is decreased, the recording-stain is monotonously decreased, and when the gap length is decreased to 0.2 μm, the recording-stain offers 0.6 μm. When the gap length is narrowed to 0.2 μm, a spread of the recording-stain is rapidly decreased. When the gap length is decreased to 0.05 μm, the recording-stain offers 0.2 μm or less. From this result, it would be understood that to suppress the recording-stain, it is preferable that the gap length is not more than 0.2 μm. According to the recording head 20 of the present embodiment, it is preferable that the gap length of the gap defined by the film thickness of at least second non-magnetic film 4 of the two gaps is not more than 0.2 μm.

Further, as shown in FIG. 12, the peak value of the head magnetic field $H_h$ offers the maximum value exceeding 500 kA/m in the vicinity of 0.15 μm in the gap length. And as the gap length is increased from the 0.15 μm, the head magnetic field $H_h$ is slowly decreased and offers 470 kA/m at 0.4 μm of the gap length. Further, the peak value of the head magnetic field $H_h$ is decreased, as the gap length is decreased from the 0.15 μm, and the head magnetic field $H_h$ offers 390 kA/m at 0.05 μm of the gap length. From this result, it would be understood that in order to obtain the strong head magnetic field $H_h$, the gap length is 0.15 μm or so. And in order to obtain the strong head magnetic field $H_h$ not less than 480 kA/m twice of the coercive force $H_c$ of the magnetic disk, which ensures the substantially complete flux reversal at the time of recording, it is preferable that the gap length is established in a range between 0.084 μm and 0.35 μm.

As mentioned above, intensity of the magnetic field leaked from the two sub-magnetic poles and a size of the recording-stain are controlled by a thickness of the soft magnetic film 3 interposed between the sub-magnetic poles and a thickness of the non-magnetic film as the gap. Incidentally, the intensity of the magnetic field and the size of the recording-stain are also controlled by the shape and the size of the sub-magnetic poles other than the thickness of the soft magnetic film 3 and the thickness of the non-magnetic film. Further, as in the recording head 20 of the present embodiment, in the event that the soft magnetic film 3 is interposed between the sub-magnetic poles, the magnetic flux passing between the sub-magnetic poles is influenced by the shape and the size of the soft magnetic film 3. Thus, the intensity of the magnetic field and the size of the recording-stain are controlled by the shape and the size of the soft magnetic film too.

Of the shape and the size of the soft magnetic film 3, there are raised height d' and width w' of the soft magnetic film, as elements which have a great effect on the intensity of the magnetic field and the size of the recording-stain.

FIG. 13 is an illustration showing an example of a recording head which is different from the recording head shown in FIG. 5 in height of the soft magnetic film.

FIG. 13 shows a main part of a recording head 20 having a soft magnetic film 3 of which a height d' is smaller than height of two sub-magnetic poles (here height d), which is different from the recording head 20 shown in FIG. 5 in height of the soft magnetic film 3.

In the event that the recording head 20 has the soft magnetic film 3 of which a height d' is smaller than height of two sub-magnetic poles, the flux is easy to concentrate in the soft magnetic film 3. For this reason, the height d' of the soft magnetic film 3 is an effective element to determine intensity of a magnetic field leaked out from the sub-magnetic poles to the magnetic disk 103. Accordingly, only an alteration of the height d' makes it possible to easily control intensity of the leaked magnetic field. In this manner, it is preferable that the recording head 20 has the soft magnetic film 3 of which a height d' is smaller than any height of the lower sub-magnetic pole 1 and the upper sub-magnetic pole 5, so that intensity of the magnetic field is easily controlled.

FIG. 14 is an illustration showing an example of a recording head which is different from the recording head shown in FIG. 6 in width of the soft magnetic film.

FIG. 14 shows a main part of a recording head 20 having a soft magnetic film 3 of which a width w' is smaller than width of two sub-magnetic poles (here width w), which is different from the recording head 20 shown in FIG. 6 in width of the soft magnetic film 3.

It is preferable that the soft magnetic film 3 has a width w' is smaller than any width of the sub-magnetic poles, so that the flux is easy to concentrate in the soft magnetic film 3, and thereby reducing a spread of the recording-stain as compared with a case where the soft magnetic film 3 has a width more than the above-mentioned width w.

Further, intensity of the magnetic field leaked from two sub-magnetic poles and a size of the recording-stain are varied in accordance with a saturation magnetic flux density B, of materials constituting the sub-magnetic poles and the soft magnetic film 3 disposed between the sub-magnetic poles. Thus, there is a need to suitably select the materials.

First, the magnetic head 20 of the present embodiment is for performing the flux reversal of the magnetic disk 103 in the vicinity of the upper sub-magnetic pole 5 to record information, and a strong magnetic field is required in the vicinity of the upper sub-magnetic pole 5. Thus, it is preferable that the upper sub-magnetic pole 5 consists of a material having saturation magnetic flux density $B_s$ which is the same as saturation magnetic flux density $B_s$ of the lower sub-magnetic pole 1 and the soft magnetic film disposed between the upper sub-magnetic pole 5 and the lower sub-magnetic pole 1, or more than the saturation magnetic flux density $B_s$.

When the soft magnetic film 3 has saturation magnetic flux density $B_s$ which is larger than that of the lower sub-magnetic pole 1, this makes it difficult to occur the magnetic saturation and thereby suppressing an expansion of the recording-stain due to such a magnetic saturation. However, in the event that the soft magnetic film 3 is similar to the upper sub-magnetic pole 5 in size of the width thereof, there is no need that the soft magnetic film 3 has saturation magnetic flux density $B_s$ which is larger than saturation magnetic flux density $B_s$ of the upper sub-magnetic pole 5 since it does not happen that the flux passes through the soft magnetic film 3 more than the upper sub-magnetic pole 5.

As seen from the situation as to the saturation magnetic flux density $B_s$, in the recording head of the present embodiment, it is preferable that the soft magnetic film 3 has saturation magnetic flux density $B_s$ not more than saturation magnetic flux density $B_s$ of the upper sub-magnetic pole 5, and also has saturation magnetic flux density $B_s$ not less than saturation magnetic flux density $B_s$ of the lower sub-magnetic pole 1. The recording head, which satisfies this condition, makes it possible to effectively enhance the head magnetic field and thereby suppressing a spread of the recording-stain.

[Magnetic Head Manufacturing Method]

Hereinafter, there will be explained a manufacturing method of the recording head 20 in conjunction with FIGS. 15 to 22. In FIGS. 15 to 22, the respective part (A) shown in the left side shows a manufacturing step of the recording head 10 looking from the same direction as the boarding surface view of FIG. 6, and the respective part (B) shown in the right side shows a manufacturing step of the recording head looking from the same section as the sectional side elevation of FIG. 5.

Each of FIGS. 15(A) and 15(B) is a view useful for understanding a first step of manufacturing a recording head.

In the first step, a lower magnetic pole solid film 1' of thickness 4 μm, which consists of, for example, $Ni_{50}Fe_{50}$ is formed by sputtering as one which is held in common with an upper shield layer, of a reproducing head (not illustrated). The lower magnetic pole solid film 1' is finally formed as the reproducing upper shield 21 and the lower sub-magnetic pole 1.

Each of FIGS. 16(A) and 16(B) is a view useful for understanding a second step of manufacturing a recording head.

The second step corresponds to the laminated film forming step referred to in the present invention. In the second step, on the lower magnetic pole solid film 1', there is formed a laminated film wherein a soft magnetic solid film and a non-magnetic solid film for supporting the soft magnetic solid film are alternately laminated. For example, as shown in FIGS. 16(A) and 16(B), a first non-magnetic solid film 2' having a thickness 0.1 μm consisting of alumina is formed on the lower magnetic pole solid film 1' by the sputtering and the like, a soft magnetic solid film 3' having a thickness 0.05 μm consisting of $Ni_{50}Fe_{50}$ is formed on the first non-magnetic solid film 2', and a second non-magnetic solid film 4' having a thickness 0.2 μm consisting of alumina is formed on the soft magnetic solid film 3'. Alternatively, it is acceptable that there is formed on the lower magnetic pole solid film 1' a laminated film wherein a plurality of soft magnetic solid films and a plurality of non-magnetic solid films are alternately laminated. In this case, both the highest film of the laminated film and the lowest film are of non-magnetic solid films.

Each of FIGS. 17(A) and 17(B) is a view useful for understanding a third step of manufacturing a recording head.

The third step corresponds to the magnetic pole forming step referred to in the present invention. In the third step, on the second non-magnetic solid film 4', which is the highest film of the laminated film formed in the second step, for example, first, there is formed a resist 6' subjected to patterning, and then plating of $Ni_{50}Fe_{50}$ is applied to the resist 6' so that an upper magnetic pole layer 5' consisting of $Ni_{50}Fe_{50}$ having a thickness over 2 μm is formed in accordance with the patterning with a core width w of 0.5 μm and a height d of 1.5 μm. The upper magnetic pole layer 5' is finally formed as the upper sub-magnetic pole 5.

Each of FIGS. 18(A) and 18(B) is a view useful for understanding a fourth step of manufacturing a recording head.

The fourth step corresponds to the trimming step referred to in the present invention. In the fourth step, an ion-milling is applied, as indicated the arrows, to the laminated film formed in the second step and the upper magnetic pole layer 5' formed in the third step, so that the upper magnetic pole layer 5' is adopted as a mask to remove portions not masked of the laminated film. Thus, the laminated film is subjected to trimming so as to provide the same core width w and height d as the upper magnetic pole layer 5' and completes formations of the first non-magnetic film 2, the soft magnetic film 3 and the second non-magnetic film 4, which constitute the recording head 20. Also with respect to the lower magnetic pole solid film 1', portions not masked of the lower magnetic pole solid film 1' are removed by 1 μm or so, so that the lower sub-magnetic pole 1 having a thickness of 1 82 m constituting the recording head 20, which is relatively projecting, is formed. Portion except the lower sub-magnetic pole 1, of the remained portion without removal of the ion-milling, of the lower magnetic pole solid film 1', is the lower magnetic pole 21.

In this manner, through the second step to the fourth step, it is possible to easily form the soft magnetic film 3 having a predetermined core width and a predetermined height.

Each of FIGS. 19(A) and 19(B) is a view useful for understanding a fifth step of manufacturing a recording head.

In the fifth step, non-magnetic layer 22' consisting of, for example, alumina is formed with a predetermined thickness by sputtering on the lower magnetic pole 21 remained without removal by the ion-milling in the fourth step, and the upper magnetic layer 5'.

Each of FIGS. 20(A) and 20(B) is a view useful for understanding a sixth step of manufacturing a recording head.

In the sixth step, the non-magnetic layer 22' laminated in the fifth step and the upper magnetic pole layer 5' are polished so that the film thickness of the upper magnetic pole layer becomes 2 μm. Adjusting the thickness of the non-magnetic layer 22' laminated in the fifth step makes it possible to perform a control of the film thickness. In this manner, when a polish is performed, formations of the upper magnetic pole 5 and the non-magnetic layer 22 constituting the recording head 20 are completed.

Each of FIGS. 21(A) and 21(B) is a view useful for understanding a seventh step of manufacturing a recording head.

In the seventh step, the recording coil 23 consisting of, for example, Cu, and the second insulating layer 24 consisting of, for example, a resist, surrounding the recording coil 23, are formed on the non-magnetic layer 22 formed in the sixth step.

Each of FIGS. 22(A) and 22(B) is a view useful for understanding an eighth step of manufacturing a recording head.

In the eighth step, on the upper magnetic pole 5 formed in the sixth step and the second insulating layer 24 formed in the seventh step, the upper magnetic pole 25 is formed through plating in the state of patterning by the resist 26. Thus, the manufacturing of the recording head 20 is completed.

Incidentally, in case of manufacturing of the recording head 20 in which the soft magnetic film 3 has height d' and width w' which are different from the height d of the pair of sub-magnetic pole and the core width w, respectively, in the second step, the soft magnetic solid film 3' and the second non-magnetic solid film 4' are not formed on the first non-magnetic solid film 2', but first, the soft magnetic film 3, which is subjected to trimming in a rectangle in accordance with the above-mentioned height d' and width w' by the lift-off scheme, is formed on the first non-magnetic solid film 2'. Then, after the non-magnetic solid film consisting of alumina or the like is laminated on the soft magnetic film 3, the laminated non-magnetic solid film is polished to provide smoothness and portion on the soft magnetic film 3 of the non-magnetic solid film is removed. Thus, a compound film of the soft magnetic film 3 of the non-magnetic film is formed, and the second non-magnetic solid film 4' is formed on the compound film. Steps after this step proceed in a similar fashion to that of the third step to the eighth step in case of the recording head in which the soft magnetic film 3 has height of two sub-magnetic poles and width w, as mentioned above, except that the compound film is formed instead of the soft magnetic solid film 3'.

As mentioned above, according to the present invention, it is possible to provide a magnetic head having excellent overwrite characteristics capable of reducing the recording-stain, a magnetic head manufacturing method of manufacturing the magnetic head, and an information recording apparatus having excellent overwrite characteristics capable of reducing the recording-stain.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A magnetic head comprising:
   a pair of magnetic poles disposed to be adjacent to or in contact with a moving recording medium, said pair of magnetic poles being placed adjacent one another with a predetermined interval at an adjacent point or a contact point with respect to the recording medium, in which a magnetic field is generated between the magnetic poles so that the recording medium is magnetized as it moves,
   a pair of sub-magnetic poles disposed between said pair of magnetic poles; and
   a pair of non-magnetic films disposed between said pair of sub-magnetic poles,
   a soft magnetic film extending between said pair of non-magnetic films, and
   wherein said soft magnetic film has a saturation magnetic flux density not more than a saturation magnetic flux density of one of said pair of magnetic poles located at said lower stream side with respect to a moving direction of said recording medium and also has a saturation magnetic flux density not less than a saturation magnetic flux density of another one of said pair of magnetic poles located at an upper stream side with respect to said moving direction of said recording medium.

2. A magnetic head according to claim 1, wherein said soft magnetic film has a length with respect to a direction perpendicular to said recording medium, said length being shorter than that of said pair of magnetic poles measured in said perpendicular direction.

3. A magnetic head according to claim 1, wherein the soft magnetic film has a thickness of 0.075 μm or less.

4. A magnetic head according to claim 1, wherein one of said pair of non-magnetic films is adjacent to a one of said pair of magnetic poles located at a lower stream side with respect to said moving direction of said recording medium, and has a thickness of 0.2 μm or less.

5. A magnetic head according to claim 1, wherein said soft magnetic film has a size smaller than that of a width direction of said pair of magnetic poles with respect to said width direction along said recording medium perpendicular to said moving direction.

6. An information recording apparatus comprising:
   a magnetic head disposed to be adjacent to or in contact with a moving recording medium while carrying a magnetization on each point of a surface of said recording medium,
   wherein information is recorded on each point of said recording medium by reversing a direction of the magnetization,
   said magnetic head further comprising:
   a pair of magnetic poles placed adjacent one another with a predetermined interval at an adjacent point or a contact point with respect to said recording medium, in which a magnetic field is generated between said pair of magnetic poles so that said recording medium is magnetized as it moves, a pair of sub-magnetic poles disposed between said pair of magnetic poles; and a pair of non-magnetic films disposed between said pair of sub-magnetic poles, a soft magnetic film extending between said pair of non-magnetic films, and wherein said soft magnetic film has a saturation magnetic flux density not more than a saturation magnetic flux density of one of said pair of magnetic poles located at said lower stream side with respect to a moving direction of said recording medium and also has a saturation magnetic flux density not less than a saturation magnetic flux density of another one of said pair of magnetic poles located at an upper stream side with respect to said moving direction of said recording medium.

7. An information recording apparatus according to claim 6, wherein a thickness of said soft magnetic film is adjusted so that a magnetic field generated between said pair of magnetic poles is not less than a coercive force of said recording medium at said adjacent point or said contact point to said soft magnetic film of said surface of said recording medium.

* * * * *